(12) United States Patent
Jarvenpaa et al.

(10) Patent No.: US 8,774,751 B2
(45) Date of Patent: Jul. 8, 2014

(54) METHOD FOR THE OBTAINING OF POSITION INFORMATION FOR A USER INITIATING AN EMERGENCY CALL IN A COMMUNICATION SYSTEM

(75) Inventors: Marko Jarvenpaa, Hyvinkaa (FI); Tero Jalkanen, Tuusula (FI)

(73) Assignee: TeliaSonera AB, Stockholm (SE)

( * ) Notice: Subject to any disclaimer, the term of this patent is extended or adjusted under 35 U.S.C. 154(b) by 193 days.

(21) Appl. No.: 13/428,213

(22) Filed: Mar. 23, 2012

(65) Prior Publication Data

US 2012/0244829 A1 Sep. 27, 2012

(30) Foreign Application Priority Data

Mar. 24, 2011 (FI) .................................... 20115284

(51) Int. Cl.
*H04M 11/04* (2006.01)
(52) U.S. Cl.
USPC ...................... 455/404.1; 455/521; 455/456.1
(58) Field of Classification Search
USPC .............. 455/404.1, 404.2, 521, 456.1–456.3
See application file for complete search history.

(56) References Cited

U.S. PATENT DOCUMENTS

| 5,742,233 A * | 4/1998 | Hoffman et al. ............ 340/573.1 |
| 6,243,039 B1 * | 6/2001 | Elliot ............................ 342/457 |
| 2007/0238448 A1 | 10/2007 | Gallagher et al. |
| 2009/0097474 A1 * | 4/2009 | Ray et al. ...................... 370/352 |
| 2010/0304705 A1 * | 12/2010 | Hursey ....................... 455/404.1 |

FOREIGN PATENT DOCUMENTS

| GB | 2424149 | 9/2006 |
| JP | 2007-99173 | 10/2008 |
| WO | 02/03718 | 1/2002 |
| WO | 2005/069671 | 7/2005 |

* cited by examiner

*Primary Examiner* — Chuong A Ngo
(74) *Attorney, Agent, or Firm* — Young & Thompson

(57) ABSTRACT

The invention relates to a system and a method. In the method publication of presence information associated with a user is received by a presence server, the presence information comprises a human-readable address for the user. A request for establishing an emergency session from the user is received to a session processing server, which routes the emergency session to a public safety answering point node. In response to receiving the emergency session, the public safety answering point node sends a subscription for at least part of the presence information to the presence server, the at least part of the presence information comprising the human-readable address for the user. The presence server provides in response the at least part of the presence information to the public safety answering point node.

20 Claims, 4 Drawing Sheets

METHOD FOR THE OBTAINING OF POSITION INFORMATION FOR A USER INITIATING AN EMERGENCY CALL IN A COMMUNICATION SYSTEM

BACKGROUND OF THE INVENTION

1. Field of the Invention

The invention relates to emergency call establishment in a communication system. Particularly, the invention relates to a method for the obtaining of position information for a user initiating an emergency call in a communication network.

2. Description of the Related Art

The obtaining of calling subscriber or user position during the establishing of an emergency call is invaluable. Ever since the introduction of digital switches it has been technically easy to obtain at least a calling line identity for the use of an emergency call answering center. In mobile communication networks where the calling subscriber identity itself usually tells nothing about the actual location of the calling subscriber there has been defined the possibility for the retrieval of calling user location. The location may be a cell identifier or even a geographic location obtained by the use of a satellite positioning system interface in the terminal or approximated distances to a number of base stations. In some cases the calling user location may be used to route an emergency call to a proper destination emergency call answering center, for example, a Public Safety Answering Point (PSAP).

3G Partnership Project (3GPP) specifications define an IP Multimedia Subsystem (IMS) that provides for multimedia session establishment over various Internet Protocol (IP) networks. Multimedia session comprise, for example, audio and video calls, instant messaging, and audio and video streaming. IMS also supports user presence sharing that enables other users to determine the status of other users. The IMS may be used not only from mobile terminals in the area of a cellular communication system that supports roaming in a uniform manner, but also from Wireless Local Area Networks (WLAN) and fixed IP networks. The fixed IP networks may provide connectivity for user terminals via a Local Area Network (LAN) or a Digital Subscriber Line (DSL) connection. An IMS user may obtain connectivity to the IMS via different IP Connectivity Access Networks (IP-CAN). The IP connectivity access for a user may be based on a gamut of different technologies. IP-CANS comprise, for example, the General Packet Radio Service (GPRS), WLANs and fixed IP networks. The different IP-CANS support very different ways for the positioning of a user. Some IP-CANS may not support any positioning of a user. Typically, when connected to a DSL switch, the position of a subscriber may usually be defined only in terms of a fiber optic cable connected to the DSL switch. The fiber optic cable may serve a relatively wide geographic area via different multiplexers and manual switching matrixes. Usually WLAN cells are directly connected to private DSL modems. Therefore, even in WLANs the positioning of a user placing an emergency call via the IMS may boil down to the problem of positioning DSL line modems. An average WLAN cell may serve a surprisingly large geographic area and the determination of the position of a user in emergency may be very difficult for the emergency personnel. Similarly, a user connected to a fixed LAN may be difficult to position because the LAN may comprise large buildings and interconnected campuses that are connected via routers and leased lines. National regulators may have different requirements for network operators as to the accuracy of the user position information. In some cases user defined position information may suffice or it may be the only technically feasible option for positioning a user.

Due to the aforementioned factors it would be beneficial to be able to obtain a user defined position for the user from the IMS. It should also be beneficial for the IMS to rely on existing mechanisms for the obtaining of the user defined position.

SUMMARY OF THE INVENTION

According to an aspect of the invention, the invention is a method, comprising: receiving a publication of presence information associated with a user, the presence information comprising a human-readable address for the user; receiving a request for establishing an emergency session from the user; routing the emergency session to a public safety answering point node; receiving a subscription for at least part of the presence information from the public safety answering point node, the at least part of the presence information comprising the human-readable address for the user; and providing the at least part of the presence information to the public safety answering point node.

According to a further aspect of the invention, the invention is a communication system, comprising: a session processing server configured to receive a request for establishing an emergency session from the user, to route the emergency session to a public safety answering point node; and a presence server configured to receive a publication of presence information associated with a user, the presence information comprising a human-readable address for the user, to receive a subscription for at least part of the presence information from the public safety answering point node, the at least part of the presence information comprising the human-readable address for the user and to provide the at least part of the presence information to the public safety answering point node.

According to a further aspect of the invention, the invention is a presence server, comprising: at least one processor configured to receive a publication of presence information associated with a user, the presence information comprising a human-readable address for the user, to receive a subscription for at least part of the presence information from the public safety answering point node, the at least part of the presence information comprising the human-readable address for the user and to provide the at least part of the presence information to the public safety answering point node.

According to a further aspect of the invention, the invention is a computer program comprising code adapted to cause the following when executed on a data-processing system: receiving a publication of presence information associated with a user, the presence information comprising a human-readable address for the user; receiving a subscription for at least part of the presence information from the public safety answering point node, the at least part of the presence information comprising the human-readable address for the user; and providing the at least part of the presence information to the public safety answering point node.

In one embodiment of the invention, the session processing server may be a call processing server or a multimedia session processing server.

In one embodiment of the invention, the session processing server comprises at least one call session control function or at least call state control function.

In one embodiment of the invention, the method further comprises determining the public safety answering point node as a source of the subscription; and authorizing the subscription in response to the determination.

In one embodiment of the invention, the method further comprises authenticating the public safety answering point node.

In one embodiment of the invention, the method further comprises routing the subscription from the public safety answering point node to an inquiring call session control function in a public land mobile network serving the user; routing the subscription from the inquiring call session control function to a serving call session control function serving the user; and routing the subscription from the serving call session control function to a presence server.

In one embodiment of the invention, the method further comprises using a secure tunnel to transmit the subscription from the public safety answering point node to a presence server or to an inquiring call session control function.

In one embodiment of the invention, the method further comprises determining an identity of the public land mobile network serving the user based on session establishment signaling received to the public safety answering point; and using the identity of the public land mobile network in routing the subscription from the public safety answering point node to the inquiring call session control function.

In one embodiment of the invention, the method further comprises performing an emergency registration to a home subscriber server in the public land mobile network serving the user.

In one embodiment of the invention, the method comprises receiving the human-readable address from the user to a presence user agent serving the user.

In one embodiment of the invention, the method further comprises obtaining street and city name information to a presence user agent serving the user from a server; and using the street and city name information to verify correctness of the human-readable address.

In one embodiment of the invention, the subscription is carried in a session initiation protocol message.

In one embodiment of the invention, the public safety answering point node is communicatively connected to the public switched telephone network.

In one embodiment of the invention, the public safety answering point node is communicatively connected to an internet protocol multimedia subsystem of the public land mobile network serving the user.

In one embodiment of the invention, the communication system comprises a mobile communication network.

In one embodiment of the invention, the public safety answering point node is a call or session processing node comprised within a Public Safety Answering Point (PSAP). The public safety answering point node may be an emergency center node, for example, a switch or a node receiving emergency calls or sessions.

In one embodiment of the invention, the communication system comprises at least one of a Global System of Mobile Communications (GSM) network, a Universal Mobile Telephone System (UMTS) network and a 4G (Long-Term Evolution) network. The mobile station may be, for example, a GSM mobile station or a UMTS mobile station with a dual mode or multimode functionality to support different access types.

In one embodiment of the invention, the computer program is stored on a computer readable medium. The computer readable medium may be a removable memory card, a removable memory module, a magnetic disk, an optical disk, a holographic memory or a magnetic tape. A removable memory module may be, for example, a USB memory stick, a PCMCIA card or a smart memory card.

The embodiments of the invention described hereinbefore may be used in any combination with each other. Several of the embodiments may be combined together to form a further embodiment of the invention. A method, a communication system, a network node or a computer program to which the invention is related may comprise at least one of the embodiments of the invention described hereinbefore.

The benefits of the invention are related to making it easier for public safety answering points to obtain position information for users connected to a fixed IP network. The invention also renders the obtaining of position information entered by users easier.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
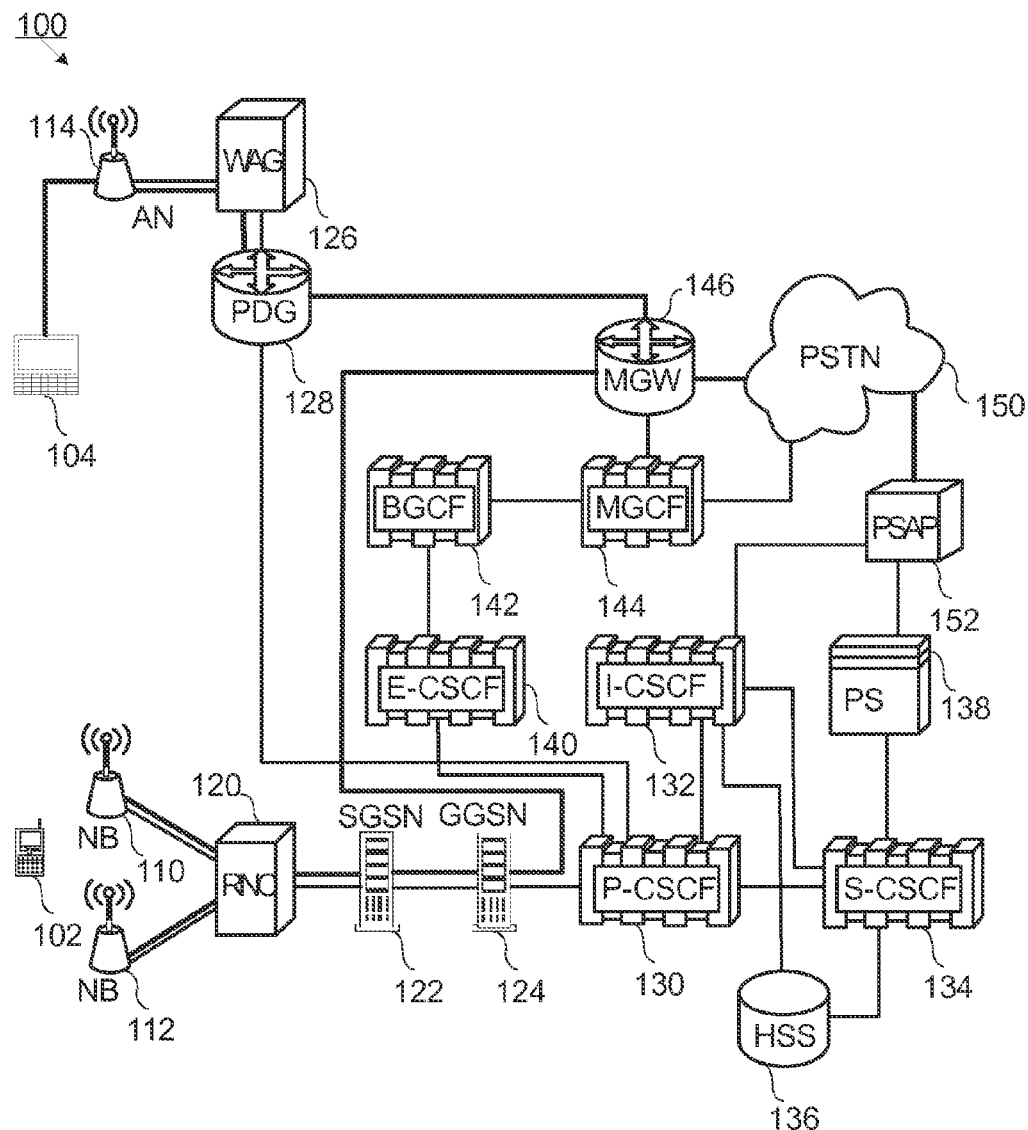
FIG. 1 is a block diagram illustrating a Universal Mobile Telecommunications System (UMTS) with a presence server configured to communicate with an emergency call processing node in one embodiment of the invention.

FIG. 1 is a block diagram illustrating a Universal Mobile Telecommunications System (UMTS) with a presence server configured to communicate with an emergency call processing node in one embodiment of the invention. The UMTS comprises a number of IP Multimedia Subsystem (IMS) nodes. An IMS comprises a number of logical Call Session Control Functions (CSCF) that may correspond to a number of different actual call processing nodes. Several logical functions may be grouped to a single call processing node. Call Session Control Functions are also sometimes referred to as Call State Control Functions (CSCF). It should be noted that the UMTS network is selected for illustrative purposes and the invention is not restricted to any specific standard. In FIG. 1 there is shown a mobile node 102, which communicates alternatively with a NodeB 110, a NodeB 112 or WLAN Access Node (AN) 114, for example, depending on which of these base stations provides best radio interface quality. The user of mobile node 102 may also alternatively use a fixed IP network access computer 104 to access the IMS via AN 114, which acts also as a DSL modem in FIG. 1. The user of mobile node 102 may use computer 104 to store subscription information that correspond to a subscription for mobile node 102. The subscription may be identified with a private user identity, for example, a private Uniform Resource Identifier (URI). The subscription may also be identified with a number of public URIs each of which refers to the same subscription. AN 114 is communicatively connected to a Packet Data Gateway (PDG) 128, which transmits IP packets to a Media Gateway (MGW) 146. A Wireless Access Gateway (WAG) 126 forms at least one IP tunnel between AN 114 and PDG 128 via WAG 126 to convey packets to and from AN 114 towards the IMS. The packets may be user plane or signaling plane packets. Within a Radio Access Network (RAN) (not shown) there is a Radio Network Controller (RNC) 120. The RAN may be, for example, a 2G GSM/EDGE Radio Access Network (GERAN), 3G UMTS Radio Access Network (UTRAN) or a 4G Evolved UTRAN (E-UTRAN). An IP Connectivity Access Network (IP-CAN) functionality connected to the access network via RNC 114 comprises at least a Serving GPRS Support Node (SGSN) 120 and a Gateway GPRS Support Node (GGSN) 122. An IP connectivity access network can also been seen as to comprise both a packet switched core network functionality and the access network. The main issue is that an IP-CAN provides IP connectivity to user terminals towards an IP network such as the Internet or an Intranet. SGSN 122 performs all mobility management related tasks and communicates with a Home Subscriber Server (HSS) 136 in order to obtain subscriber information. SGSN 122 maintains a mobility management context for mobile node 102, which comprises location information such as a Location Area (LA) of a Tracking Area (TA) in the area of which mobile node 102 may be paged. GGSN 124 provides GPRS Access Points (AP) for each network to which there is connectivity from GPRS. There is an access point, for example, to MGW 146 and to a Proxy Call Session Control Function (P-CSCF) 130. The access point to MGW 146 carries user plane media component related packets, whereas the access point to P-CSCF 130 carries signaling packets that comprise, for example, Session Initiation Protocol (SIP) messages. There may be several call processing servers in several roles that participate in call or multimedia session processing. The contact point to an IP-CAN is P-CSCF 130. The access point for P-CSCF 130 is used to convey signaling traffic pertaining to IP multimedia such as voice over IP. GGSN 124 establishes Packet Data Protocol (PDP) contexts, which are control records associated with a mobile subscriber such as the user of mobile station 102. A PDP context provides an IP address for packets received from or sent to mobile station 102. A PDP context has also associated with it a UMTS bearer providing a certain QoS for mobile station 102. In GGSN 124 there is a primary PDP context for the signaling packets associated mobile station 102. For the user plane data packets carrying at least one IP flow there is established at least one secondary PDP context. At least one IP flow is established between a calling terminal and a called terminal in association with an IP multimedia session. An IP flow carries a multimedia component, in other words a media stream, such as a voice or a video stream in one direction. For voice calls at least two IP flows are required, one for the direction from the calling terminal to the called terminal and one for the reverse direction. In this case an IP flow is defined as a quintuple consisting of a source port, a source address, a destination address, a destination port and a protocol identifier.

The communication system illustrated in FIG. 1 comprises also the IP Multimedia Subsystem (IMS) functionality. The IMS is used to set-up multimedia sessions over IP-CAN. The network functionalities supporting IMS comprise at least one Proxy Call Session Control Function (P-CSCF) such as P-CSCF 130, at least one Inquiring Call Session Control Function (I-CSCF) such as a I-CSCF 132, at least one Serving Call Session Control Function (S-CSCF) such as a S-CSCF 134, at least one Breakout Gateway Control Function (BGCF) such as BGCF 142 and at least one Media Gateway Control Function (MGCF) such as MGCF 144. The P-CSCF, I-CSCF and S-CSCF are mere functionalities that may be mapped differently to physical Call Processing Servers (CPS) even though they in FIG. 1 they are separate network elements. As part of the IMS there is also at least one Home Subscriber Server (HSS) such as HSS 136. There is also at least one Application Server (AS) such as a Presence Server (PS) 138, which provides a variety of services for mobile subscribers served by the IMS.

P-CSCF 130 receives signaling plane packets from GGSN 124. Session Initiation Protocol (SIP) signaling messages are carried in the signaling plane packets. The signaling message is processed by P-CSCF 130, which determines the correct serving network for the mobile station 102 that sent the signaling packet. The determination of the correct serving network is based on a home domain name provided from mobile station 102. Based on the home domain name is determined the correct I-CSCF such as I-CSCF 132. I-CSCF 132 hides the topology of the serving network from the networks, in which mobile station 102 happens to be roaming. I-CSCF 132 may take contact to home subscriber server 136, which returns the name of the S-CSCF 134, which is used to determine the address of the S-CSCF to which the mobile station 102 is to be registered. If I-CSCF must select a new S-CSCF for mobile station 102, HSS 136 returns required S-CSCF capabilities for S-CSCF selection in I-CSCF 132. Upon receiving a registration, S-CSCF 134 obtains information pertaining to the profile of the mobile station 102 from HSS 136. The information returned from HSS 136 may be used to determine the required trigger information that is used as criterion for notifying an Application Server (AS) such as PS 138, which may also be referred to as a value-added server or a service node. The trigger criteria are also referred to as filtering criteria. The AS may be notified on events relating to incoming registrations or incoming session initiations. The application server may communicate with S-CSCF 134 using the ISC-interface. The acronym ISC stands for IP multimedia subsystem Service Control interface. The protocol used on ISC interface may be SIP. The AS may alter SIP INVITE message contents that it receives from S-CSCF 134. The modified SIP INVITE message is returned back to S-CSCF 134. If the session to be initiated is targeted to a PSTN 150 subscriber or a circuit switched network subscriber, the SIP INVITE message is forwarded to a BGCF 142. BGCF 142 determines the network in which interworking to PSTN 150 or the circuit switched network should be performed. In case PSTN interworking is to be performed in the current network, the SIP INVITE message is forwarded to MGCF 144 from BGCF 142. In case PSTN interworking is to be performed in another network, the SIP INVITE message is forwarded from BGCF 142 to a BGCF in that network (not shown). MGCF 144 communicates with MGW 146. The user plane packets carrying a media bearer or a number of interrelated media bearers for the session are routed from GGSN 124 to MGW 146 as illustrated in FIG. 1 with a thick line. Generally, in FIG. 1 user plane is illustrated with a thick line and control plane with thinner line.

The IMS also supports presence related subscriptions and notifications. For incoming subscriptions to presence data for a user identified with a URI, an I-CSCF such as I-CSCF 132 receives the subscription in the form of a SIP SUBSCRIBE operation from a watcher in the same IMS network or in a different IMS network. The URI may be a private URI or a public URI. I-CSCF 132 queries HSS 136 using the URI to find out the S-CSCF serving the user. In FIG. 1 it may be assumed that I-CSCF 132 obtains a name of S-CSCF 134 from HSS 136 in response to the user URI. I-CSCF 132 sends the subscription to S-CSCF 134 which may route the subscription further to PS 138.

In case the session to be initiated via P-CSCF 130 is determined by P-CSCF 130 to be an emergency session such as, for example, an audio emergency call, the session invitation is routed to an Emergency CSCF (E-CSCF) by P-CSCF 130. Generally, in emergency sessions P-CSCF 130 detects the emergency status of a session regarding a session establishment request such as a SIP INVITE message. P-CSCF 130 may prevent non-emergency requests that are associated with an emergency registration. P-CSCF 130 may query the IP-CAN, for example, via HSS 136, SGSN 122 or a Gateway Mobile Location Server (GMLC) (not shown) which acts serves position information regarding subscribers within the radio access network, for location information of mobile subscriber 102 or computer 104 that sent the emergency session request. Depending on requested position quality, the position information provided may be a geographic location, a cell identifier, a tracking area identifier or a location area identifier. P-CSCF 130 selects an E-CSCF such as E-CSCF 140 in the same network to handle the emergency session request. Emergency sessions are handled locally from the current network. E-CSCF 140 routes the emergency session to via a BGCF and a MGCF, such as BGCF 142 and MGCF 144, towards MGW 146 and PSTN 150 if a Public Safety Answering Point (PSAP) is accessed via PSTN 150. If the PSAP is accessed via an IP network, the PSAP may communicate, for example, using SIP signaling with E-CSCF 140 directly. In FIG. 1 a PSAP 152 is connected to PSTN 150.

In FIG. 1 PSAP 152 is configured to communicate with an Application Server (AS) acting as a Presence Server (PS) 138. The PSAP 152 comprises a communication interface for communicating using SIP signaling with PS 138. The communication interface may comprise a DSL connection or other IP connectivity towards an IP network from which there is routing of packets to PS 138.

The embodiments of the invention described hereinbefore in association with FIG. 1 may be used in any combination with each other. Several of the embodiments may be combined together to form a further embodiment of the invention.

Figure 2:
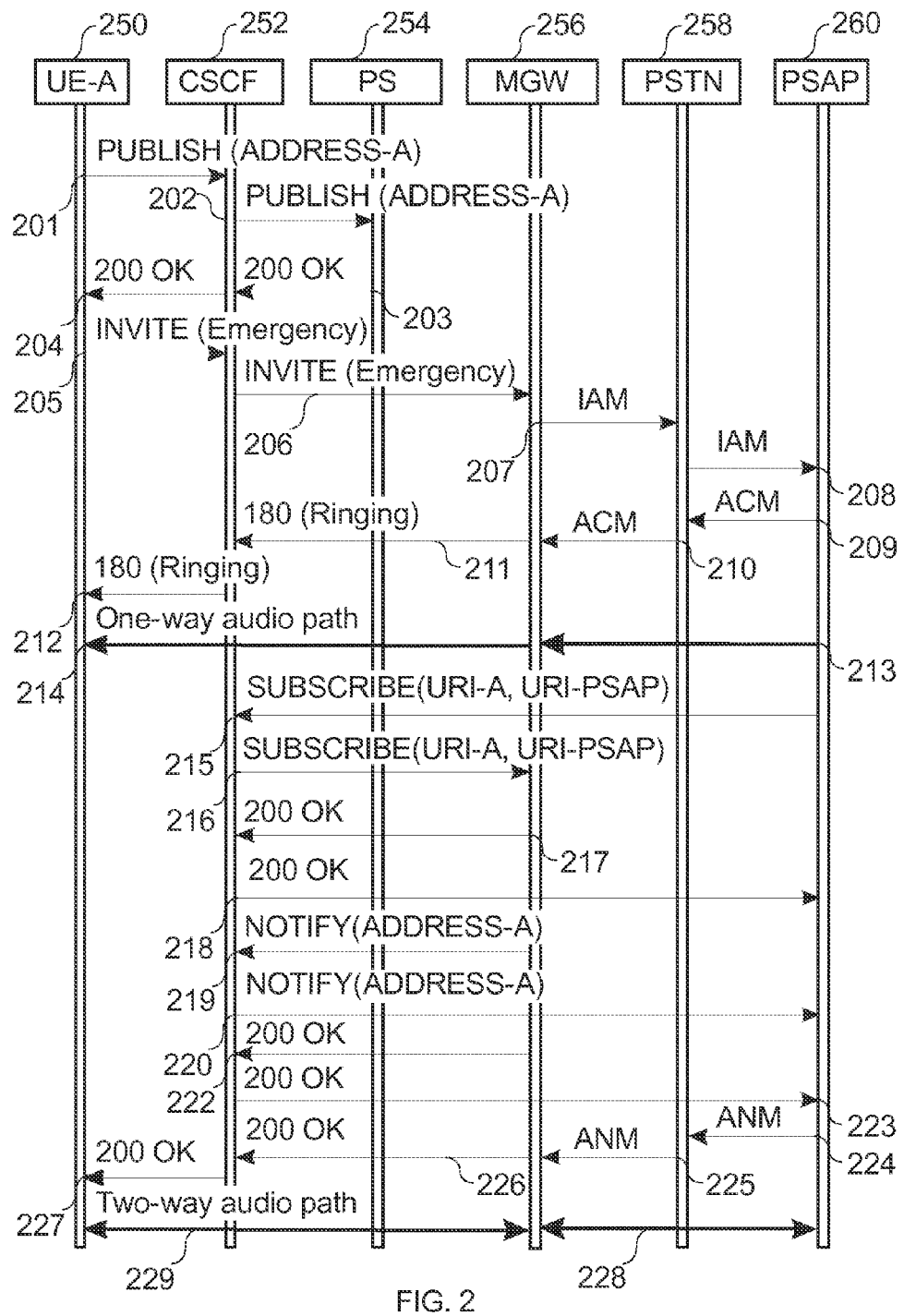
FIG. 2 is a message sequence chart illustrating a method for the obtaining of position information for a user initiating an emergency call in one embodiment of the invention.

FIG. 2 is a message sequence chart illustrating a method for the obtaining of position information for a user initiating an emergency call in one embodiment of the invention.

In FIG. 2 there is a User Equipment (UE) for calling user (UE-A) 250. UE-A 250 may be a mobile node or a computer communicating with an IMS via a fixed IP access connection. UE-A communicates with a CSCF 252, which represents at least one IMS node. The at least one IMS node may comprise a P-CSCF and an E-CSCF as illustrated in FIG. 1. CSCF 252 communicates with a Presence Server (PS) 254. CSCF 252 communicates also with a PSTN 258 via a Media Gateway (MGW) 256. PSTN 258 communicates with a Public Safety Answering Point (PSAP) 260. PSTN 258 is represented by at least one PSTN exchange (not shown) via which signaling and a speech path is established to PSAP 260.

In one embodiment of the invention, PSAP 260 comprises at least two physical nodes, one for communicating with PS 254 and one for communicating with PSTN 258. One of the at least two physical nodes comprises an interface for communicating with a human operator.

The starting point in FIG. 2 is that UE-A has performed a registration to the IMS represented by CSCF 252. The registration may be performed as an emergency registration or previously as a normal registration to the IMS.

As illustrated with arrow 201, UE-A 250 sends a SIP PUBLISH operation to CSCF 252. The SIP PUBLISH operation comprises an identifier of the user of UE-A 250 such as a public URI or a private URI and presence information comprising at least one address field specifying a human-readable address for the user of UE-A 250. The presence information may be structured as an XML document specifying at least one element for specifying a human-readable address. The human-readable address may be a street address. The presence information may be carried in a body of the SIP PUBLISH operation.

In one embodiment of the invention, UE-A 250 comprises a SIP client that is configured to prompt the user for the human-readable address using automatic form filling in order to avoid typing errors and intentional giving of completely invalid information. The SIP client in UE-A 250 may be configured to communicate with a server for providing a catalog of street names and city names that are used during the automatic filling of the form for the human-readable address.

As illustrated with arrow 202, CSCF 252 sends the SIP PUBLISH operation to PS 254. PS 254 stores the presence information comprising at least one address field specifying a human-readable address for the user of UE-A 250 to an XML document database.

As illustrated with arrows 203 and 204, the SIP PUBLISH operation is acknowledged by PS 254 to UE-A 250 using a SIP 200 OK message via CSCF 252.

As illustrated with arrow 205, UE-A 250 sends a SIP INVITE operation to CSCF 252. The SIP INVITE operation comprises an identifier of the user of UE-A 250 such as a public URI or a private URI. The SIP INVITE operation also comprises an indication that the session to be established is an emergency session. The indication may be a specific operation parameter such as a TEL-URI of the called party specifying an emergency number. CSCF 252 may also comprise an E-CSCF, a BGCF and a MGCF function as illustrated in FIG. 1. CSCF 252 determines that the emergency session is to be established via MGW 256 to PSTN 258. The MGW 256 may also comprise a Signaling Gateway Control Function (SGCF) for signaling interworking with PSTN 258.

As illustrated with arrow 206, CSCF 254 sends a SIP INVITE operation to MGW 256. MGW 256 maps the SIP INVITE message parameters ISDN User Part (ISUP) signaling message parameters. For example, a public or private URI for the user of UE-A may be translated to an E.164 number for the calling party number parameter in ISUP. Instead of ISUP any SS7 signaling may be used.

As illustrated with arrow 207, MGW 256 sends an ISUP Initial Address Message (IAM) to PSTN 258.

As illustrated with arrow 208, PSTN 258 routes the call to PSAP 260 and sends the IAM message to PSAP 260.

As illustrated with arrow 209, PSAP 260 sends an ISUP Address Complete Message (ACM) to PSTN 258. The ACM may carry a free indicator in response to determining that an operator is free to answer the emergency call.

As illustrated with arrow 210, PSTN 258 sends the ACM message to MGW 256.

As illustrated with arrow 211, MGW 256 translates the ACM message comprising a free indicator to a SIP 180 operation indicating ringing of the called party. The SIP 180 operation is sent to CSCF 252. In one embodiment of the invention, the ringing of the called party is indicated with a separate ISUP Call Progress Message (CPG) specifying a free indicator.

As illustrated with arrow 212, CSCF 252 sends the SIP 180 operation to UE-A 250.

As illustrated with arrows 213 and 214 a one-way audio path from the called party to the calling party may be established in response to the free indication of the called party.

In order to speed-up the emergency session handling process, the PSAP 260 may obtain the human-readable address of the user while the call is being answered. In one embodiment of the invention, the subscription and the obtaining of the human-readable address is performed only after the emergency call has been answered.

As illustrated with arrow 215, PSAP 260 sends a SIP SUBSCRIBE operation to IMS via CSCF 252. The SIP SUBSCRIBE operation comprises a URI of the user of the UE-A 250 such as a public URI or a private URI. The SIP SUBSCRIBE operation may also comprise an indication that the SIP SUBSCRIBE operation is from PSAP 260. The indication may be a URI of PSAP 260.

As illustrated with arrow 216, CSCF 252 sends the SIP SUBSCRIBE operation to PS 254. Using the URI of the user of UE-A 250 CSCF 252 obtains at least one presence tuple associated with the URI stored in the XML document database. Due to the fact that the SIP SUBSCRIBE operation is originated from a PSAP, CSCF 252 may determine that requesting of authorization from the user is not needed, in case access to the at least one presence tuple is not allowed for all users in an access control list of the at least one presence tuple.

As illustrated with arrow 217, PS 254 sends a SIP 200 OK operation to CSCF 252 as an acknowledgement of the SIP SUBSCRIBE operation.

As illustrated with arrow 218, CSCF 252 sends the SIP 200 OK operation to PSAP 260.

As illustrated with arrow 219, PS 254 sends a SIP NOTIFY operation to CSCF 252. The SIP NOTIFY address is sent as a further response to the SIP SUBSCRIBE operation illustrated with arrow 216. The SIP NOTIFY operation comprises at least one address field carrying a human-readable address of the user.

As illustrated with arrow 220, CSCF 252 sends the SIP NOTIFY operation to PSAP 260. PSAP 260 obtains the at least one address field to indicate the address of the user. The address may be indicated on a map or as text or both.

As illustrated with arrow 221, PSAP 260 sends a SIP 200 OK operation to CSCF 252 acknowledging the SIP NOTIFY operation.

As illustrated with arrow 222, CSCF sends the SIP 200 OK operation to PS 254.

As illustrated with arrow 223, PSAP 260 sends an ISUP Answer Message (ANM) to PSTN 258.

As illustrated with arrow 224, PSTN 258 sends the ANM message to MGW 256.

As illustrated with arrow 225, MGW 256 translates the ANM message to a SIP 200 OK message associated with the SIP INVITE operation illustrated with arrow 206 and sends the SIP 200 OK message to CSCF 252.

As illustrated with arrow 226, CSCF 252 sends the SIP 200 OK message to UE-A 250.

As illustrated with arrows 227 and 228 a two-way audio path is established between PSAP 260 and UE-A 250 through the IMS and MGW 256 in response to the ANM and SIP 200 OK messages.

Figure 3:
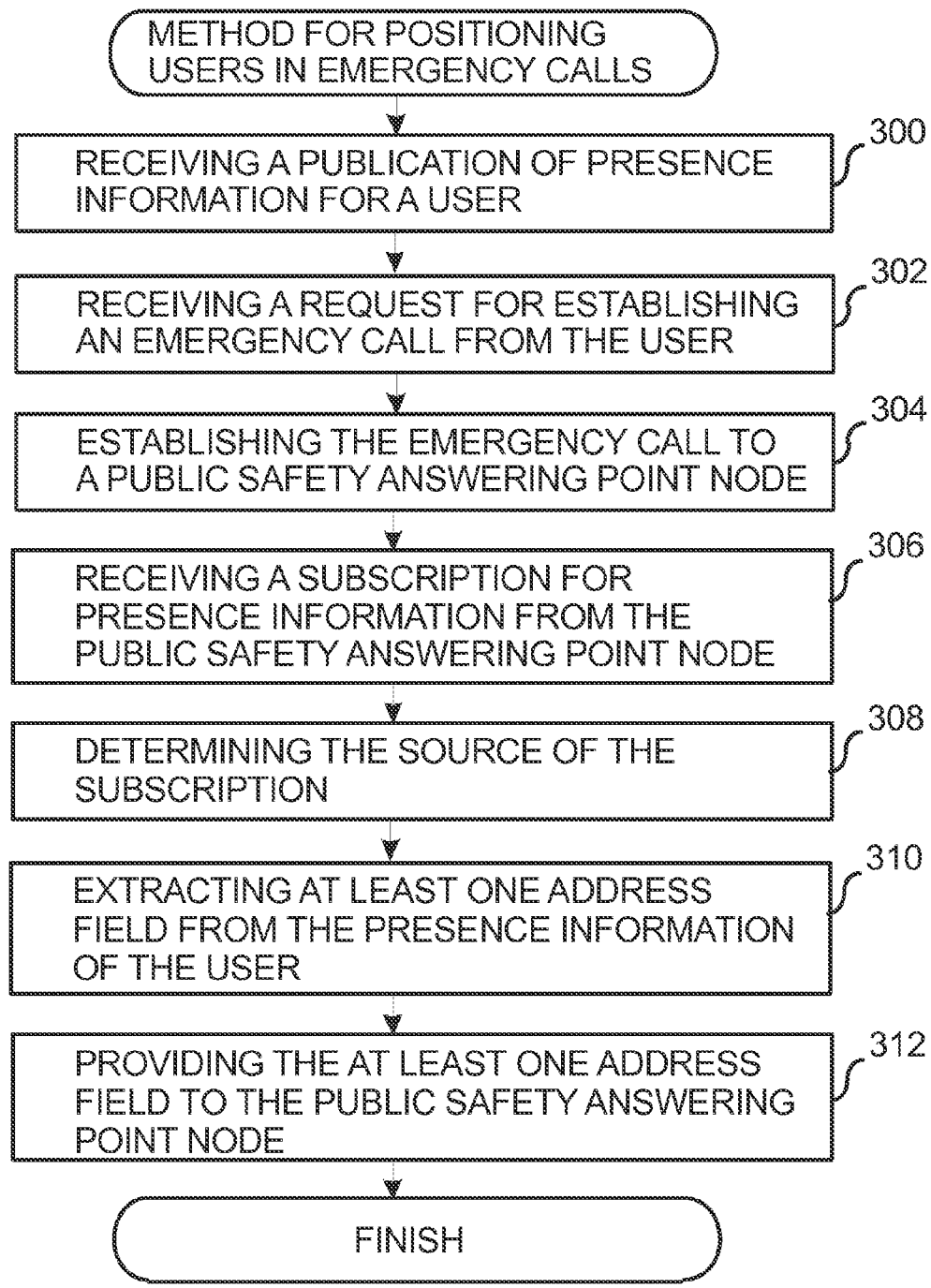
FIG. 3 is a flow chart illustrating a method for the obtaining of position information for a user initiating an emergency call in one embodiment of the invention.

FIG. 3 is a flow chart illustrating a method for the obtaining of position information for a user initiating an emergency call in one embodiment of the invention.

At step 300, a publication of presence information for a user is received by a presence server. The presence information comprises human-readable address of the user.

At step 302, a call processing server receives a request for establishing an emergency session from the user.

At step 304, the emergency session is established to a public safety answering point node.

At step 306, a subscription for presence information associated with the user is received from the public safety answering point node.

At step 308, the presence server determines the origin of the subscription for presence information. In response to the determination that the subscription originates from the public safety answering point node, the presence server may bypass a specific requesting of user authorization for the subscription from the user.

At step 310, the presence server extracts at least one human-readable address field from the presence information.

At step 312, the presence server provides the at least one human-readable address field to the public safety answering point node.

Thereupon, the method is finished.

Figure 4:
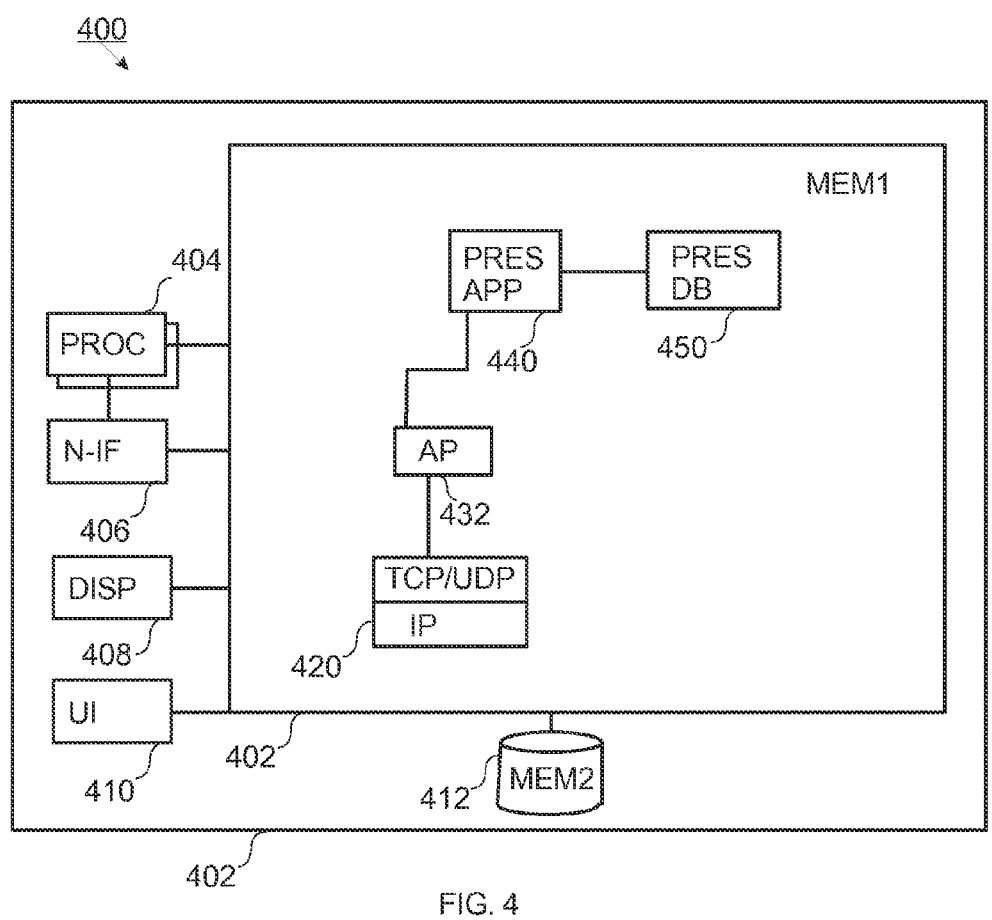
FIG. 4 is a block diagram illustrating a presence server in one embodiment of the invention.

FIG. 4 is a block diagram illustrating a presence server in one embodiment of the invention. The application server may execute the method illustrated in FIGS. 2 and 3. The application server may be the presence server 138 illustrated in FIG. 1.

In FIG. 4 there is illustrated a presence server 400. The internal functions of presence server 400 are illustrated with box 401. Presence server 400 comprises at least one processor, for example, processor 404, at least one secondary memory, for example, secondary memory 412 and at least one primary memory, for example, primary memory 402. Presence server 400 may also comprise any number of other processors and any number secondary memory units. There may also be other primary memories with separate address spaces. Presence server 400 comprises also a network interface 406. Network interface 406 may, for example, be a cellular radio interface, a Wireless Local Area Network (WLAN) interface, a local area network interface or a wide area network interface. Network interface is used to communicate to the Internet or locally to at least one computer. Application server may also comprise a display interface 408 that may comprise a graphics card and a socket for an external display. The display interface may also be a network card for connecting via a data network to an external user interface client such as a browser in a remote computer.

Processor 404 or at least one similarly configured processor within application server 400 executes a number of software entities stored at least partly in primary memory 402. Primary memory 402 comprises an IP protocol stack 420, an application protocol entity 432. Primary memory 408 comprises also a presence application 440 and a presence database 450.

Application protocol entity 432 may represent different protocols, for example, HTTP, HTTPS, SIP, HTTPR, XCAP, BEEP or RTSP. Application protocol entity 432 receives a subscription for presence data related to a user and provides in response presence data for the user. The SIP, HTTP and HTTPS messages may comprise a further message structure such as Simple Object Adapter Protocol (SOAP) which specifies an extensible markup language based message format to carry remote method invocations and results.

The entities within application server 400 such as IP protocol stack 420, application protocol entity 432 and presence application 440 may be implemented in a variety of ways. They may be implemented as processes executed under the native operating system of the network node or the network node. The entities may be implemented as separate processes or threads or so that a number of different entities are implemented by means of one process or thread. A process or a thread may be the instance of a program block comprising a number of routines, that is, for example, procedures and functions. The entities may be implemented as separate computer programs or as a single computer program comprising several modules, libraries, routines or functions implementing the entities. The program blocks are stored on at least one computer readable medium such as, for example, a memory circuit, a memory card, a holographic memory, magnetic or optic disk. Some entities may be implemented as program modules linked to another entity. The entities in FIG. 4 may also be stored in separate memories and executed by separate processors, which communicate, for example, via a message bus or an internal network within the network node. An example of such a message bus is the Peripheral Component Interconnect (PCI) bus. The internal network may be, for example, a local area network. The entities may also be partly or entirely implemented as hardware, such as ASICS or FPGAs. An entity may be a software component or a combination of software components.

The embodiments of the invention described hereinbefore in association with FIG. 4 may be used in any combination with each other. Several of the embodiments may be combined together to form a further embodiment of the invention.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3 G communications networks, 4 G communications networks Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The embodiments of the invention described hereinbefore in association with FIGS. 1, 2, 3 and 4 may be used in any combination with each other. Several of the embodiments may be combined together to form a further embodiment of the invention.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A communication method, comprising:
receiving a human-readable address from a user to a presence agent serving the user, the human-readable address being a street address;
receiving, by a presence server, a publication of presence information associated with the user, the presence information comprising the human-readable address for the user;
receiving, by a multimedia session processing server, a request for establishing an emergency session from the user;
routing the emergency session to a public safety answering point node by the multimedia session processing server;
receiving, by the presence server, a subscription carried in a session initiation protocol message for at least part of the presence information from the public safety answering point node, the at least part of the presence information comprising the human-readable address for the user;
determining the public safety answering point node as a source of the subscription;
authorizing the subscription in response to the determination; and
providing, by the presence server, the at least part of the presence information to the public safety answering point node.

2. The method according to claim 1, the method further comprising:
authenticating the public safety answering point node.

3. The method according to claim 1, the method further comprising:

routing the subscription from the public safety answering point node to an inquiring call session control function in a public land mobile network serving the user;
routing the subscription from the inquiring call session control function to a serving call session control function serving the user; and
routing the subscription from the serving call session control function to a presence server.

4. The method according to claim 3, the method further comprising:
determining an identity of the public land mobile network serving the user based on session establishment signaling received to the public safety answering point; and
using the identity of the public land mobile network in routing the subscription from the public safety answering point node to the inquiring call session control function.

5. The method according to claim 1, the method further comprising:
performing an emergency registration to a home subscriber server in the public land mobile network serving the user.

6. The method according to claim 1, the method further comprising:
obtaining street and city name information to the presence user agent serving the user from the presence server; and
using the street and city name information to verify correctness of the human-readable address.

7. The method according to claim 1, wherein the public safety answering point node is communicatively connected to the public switched telephone network.

8. The method according to claim 1, wherein the public safety answering point node is communicatively connected to an internet protocol multimedia subsystem of the public land mobile network serving the user.

9. A communication system, comprising:
a multimedia session processing server configured to receive a request for establishing an emergency session from a user, to route the emergency session to a public safety answering point node;
a presence user agent configured to receive a human-readable address from the user, the human-readable address being a street address; and
a presence server configured to receive a publication of presence information associated with the user, the presence information comprising the human-readable address for the user, to receive a subscription carried in a session initiation protocol message for at least part of the presence information from the public safety answering point node, the at least part of the presence information comprising the human-readable address for the user, to determine the public safety answering point node as a source of the subscription, to authorize the subscription in response to the determination, and to provide the at least part of the presence information to the public safety answering point node.

10. The communication system according to claim 9, the communication system further being configured to:
authenticate the public safety answering point node.

11. The communication system according to claim 9, the communication system further being configured to:
route the subscription from the public safety answering point node to an inquiring call session control function in a public land mobile network serving the user;
route the subscription from the inquiring call session control function to a serving call session control function serving the user; and
route the subscription from the serving call session control function to a presence server.

12. The communication system according to claim 11, the communication system further being configured to:
determine an identity of the public land mobile network serving the user based on session establishment signaling received to the public safety answering point; and
utilize the identity of the public land mobile network in routing the subscription from the public safety answering point node to the inquiring call session control function.

13. A presence server, comprising:
a processor, and a memory storing instructions that, when executed, cause the apparatus to receive a publication of presence information associated with a user, the presence information comprising a human-readable address for the user, the human readable address being a street address, the human readable address being received from the user to a presence user agent serving the user, to receive a subscription carried in a session initiation protocol message for at least part of the presence information from the public safety answering point node, the at least part of the presence information comprising the human-readable address for the user, to determine the public safety answering point node as a source of the subscription, to authorize the subscription in response to the determination, and to provide the at least part of the presence information to the public safety answering point node.

14. The presence server according to claim 13, the presence server further being configured to:
authenticate the public safety answering point node.

15. The presence server according to claim 13, the presence server further being configured to:
route the subscription from the public safety answering point node to an inquiring call session control function in a public land mobile network serving the user;
route the subscription from the inquiring call session control function to a serving call session control function serving the user; and
route the subscription from the serving call session control function to a presence server.

16. The presence server according to claim 15, the presence server further being configured to:
determine an identity of the public land mobile network serving the user based on session establishment signaling received to the public safety answering point; and
utilize the identity of the public land mobile network in routing the subscription from the public safety answering point node to the inquiring call session control function.

17. The computer program according to claim 15, the computer program further being configured to:
determine an identity of the public land mobile network serving the user based on session establishment signaling received to the public safety answering point; and
utilize the identity of the public land mobile network in routing the subscription from the public safety answering point node to the inquiring call session control function.

18. The computer program according to claim 13, the computer program further being configured to:
authenticate the public safety answering point node.

19. The computer program according to claim 13, the computer program further being configured to:

route the subscription from the public safety answering point node to an inquiring call session control function in a public land mobile network serving the user;

route the subscription from the inquiring call session control function to a serving call session control function serving the user; and route the subscription from the serving call session control function to a presence server.

20. A computer program stored on a non-transitory computer readable medium comprising code adapted to cause the following when executed on a data-processing system:

receiving, by a presence server, a publication of presence information associated with a user, the presence information comprising a human-readable address for the user, the human readable address being a street address, the human readable address being received from the user to a presence user agent serving the user;

receiving, by the presence server, a subscription carried in a session initiation protocol message for at least part of the presence information from the public safety answering point node, the at least part of the presence information comprising the human-readable address for the user;

determining the public safety answering point node as a source of the subscription;

authorizing the subscription in response to the determination; and providing, by the presence server, the at least part of the presence information to the public safety answering point node.

* * * * *